United States Patent [19]

Yamamura et al.

[11] 4,317,079
[45] Feb. 23, 1982

[54] BURIED CABLE LOCATING SYSTEM

[75] Inventors: Kazuomi Yamamura, Yokohama; Takasuke Fukui, Tokyo; Yoshinao Iwamoto, Fujimi; Yuichi Shirasaki, Tokyo; Masayuki Fujise, Yamato, all of Japan

[73] Assignee: Kokusai Denshin Denwa Co. Ltd., Tokyo, Japan

[21] Appl. No.: 72,282

[22] Filed: Sep. 4, 1979

[30] Foreign Application Priority Data

Sep. 4, 1978 [JP] Japan .................. 53/107463

[51] Int. Cl.³ ............. G01V 3/11; G01V 3/165; G01V 3/38
[52] U.S. Cl. ........................................ 324/326
[58] Field of Search ............ 324/52, 67, 207, 208, 324/326, 345

[56] References Cited

U.S. PATENT DOCUMENTS

| | | | |
|---|---|---|---|
| 3,745,452 | 7/1973 | Osburn et al. | 324/52 X |
| 3,907,136 | 9/1975 | Christides et al. | 324/67 X |
| 4,085,360 | 4/1978 | Howell | 324/326 |
| 4,091,322 | 5/1978 | Stankoff | 324/67 X |
| 4,130,791 | 12/1978 | Slough et al. | 324/326 |
| 4,134,061 | 1/1979 | Gudgel | 324/326 X |
| 4,220,913 | 9/1980 | Howell et al. | 324/326 X |

FOREIGN PATENT DOCUMENTS

| | | | |
|---|---|---|---|
| 1509914 | 5/1978 | United Kingdom | 324/326 |
| 526838 | 8/1976 | U.S.S.R. | 324/326 |

Primary Examiner—Gerard R. Strecker
Attorney, Agent, or Firm—Allan Ratner

[57] ABSTRACT

A cable buried under a sea bottom is located by flowing in the cable an electrical current, and measuring the magnetic flux by said current at four points near the cable. The present cable detecting system comprises nondirectional flux measurement means searching for the cable to be detected and measuring the flux by said electric current at four vertex points forming a horizontal square plane, means for transmitting the measured values to a cable ship, means mounted in said ship for providing squared amplitude ratios of each of said magnetic flux to a selected one of the magnetic flux, and means for providing the distance to the cable from the center of said four vertex points, the angle between the transverse direction to the cable and the extension of the diagonal line of said four vertex points, and the depth between the cable and said horizontal square plane, on the principle that said amplitude ratio is equal respectively to the reciprocal of the corresponding ratio of the distance between said cable and each of said points.

7 Claims, 10 Drawing Figures

BURIED CABLE LOCATING SYSTEM

BACKGROUND OF THE INVENTION

This invention relates to a system to detect the location of an underground cable particularly of a submarine cable buried in the seabed or in the riverbed.

In the case where a submarine cable is layed, the practice is observed in the recent years that the cable is buried in the seabed or in the riverbed rather than simply layed thereon, because this is effective to avoid the accidental breakage of the cable due to fishing gears and ankers of vessels and the like nearby the area in which the cable is located. It is sometimes necessary to lift such a submarine cable for repair. One of the presently prevailing systems for lift of such a cable is to employ a special hook having a shape which allows the hook to bite into the seabed, when it is towed along the surface of the seabed in the direction crossing the cable, for the purpose to allow the hook to grapple the cable and to lift the same. However, since the cable is buried tightly in the seabed, this prevailing system is accompanied by a fault in which the hook is inclined to accidentally break the cable, unless the tow is suspended immediately after the hook grapples the cable. Therefore, the hook is required to be towed in an extremely slow pace to make sure that the tow can be stopped as immediately as possible. Although some type of radio navigation system such as Loran is employed to determine the place where a cable is to be layed or buried, the accuracy of the location is not necessarily high, and location error is often a range from several hundred meters to several thousand meters. Therefore, it is actually necessary to have the hook towed for a considerable distance to locate the cable. This naturally causes the fault that a considerable amount of time and labor is required for the attempt to locate the cable. It is notable, however, that if the location, the buried depth and the direction of an buried cable to be located are known prior to the commencement of the attempt for grappling of the cable, it makes it possible to select a type of special hook which is involved with the optimum efficiency with respect to the specific kind of soil forming the specific seabed and also with respect to the specific buried depth, resultantly making it possible to grapple a cable by towing the hook for a less distance in the direction crossing the cable.

A number of efforts have been made for development of techniques to detect the location of and the direction of a cable. One of the presently available techniques for detection of the location of a cable is a system which utilizes a specific change in output of a detector which change is expected, when the detector crosses the cable. However, this system is accompanied by two kinds of faults, the first of which is that since the specific change in output appears only in one moment while the detector is crossing the cable, it is necessary to keep watching the detector during the entire period in which the cable detecting efforts are made, not to miss the specific moment, and the second of which is that it is difficult to make an accurate marking of the location of the cable detected by this system. On the other hand, though repetition of the above mentioned system makes it possible to detect the rough direction of the cable, this of course is involved with a fault in which a considerable amount of time and labor is required.

SUMMARY OF THE INVENTION

An object of this invention is to provide a system which is free from the above mentioned faults. This invention is directed to a system in which plural magnetic flux detectors with the non-directional detection characteristics are employed for detection of the signal magnetic flux to be generated around a cable by a signal electric current flowing in the conductor of the cable on one end of which an electric signal is applied, whereby the location of the cable can be detected from the information obtained by application of an arithmetical process to the amplitude ratios of the signals detected by said detectors. This system is characterized by a feature that the detection is possible at a place considerably distant from the cable and regardless of the intensity of signal electric current flowing in the cable. According to this invention, the location and the direction of a cable can be detected from a distant place. Therefore, this is expected to make it easy to make marking of the location of a cable which has been deemed difficult so far, resulting in a considerably improved efficiency in the attempts to grapple a cable. Further, in the cases where the depth in which a cable is buried can be detected, another advantage can be expected which makes it possible to make sure the detection of the location of a cable by adjusting the depth in which the hook bites into the seabed.

In accordance with the invention, there is provided non-directional flux measurement means located near the cable for measuring flux from the electric current at four vertex points. The points form a horizontal square plane. Means are provided responsive to squared amplitude ratios for determining distance to the cable from the center of the four vertex points, the angle between a transverse direction to the cable and extension of a diagonal line from the four vertex points and depth between the cable and the horizontal square plane. In this manner, the distance, the angle and the depth each have a mathematical relationship to the amplitude ratios.

BRIEF DESCRIPTION OF THE DRAWINGS

The foregoing and other objects, features, and attendant advantages of the present invention will be understood as the same become better understood by means of the following description and accompanying drawings wherein.

DESCRIPTION OF THE PREFERRED EMBODIMENTS

Figure 1:
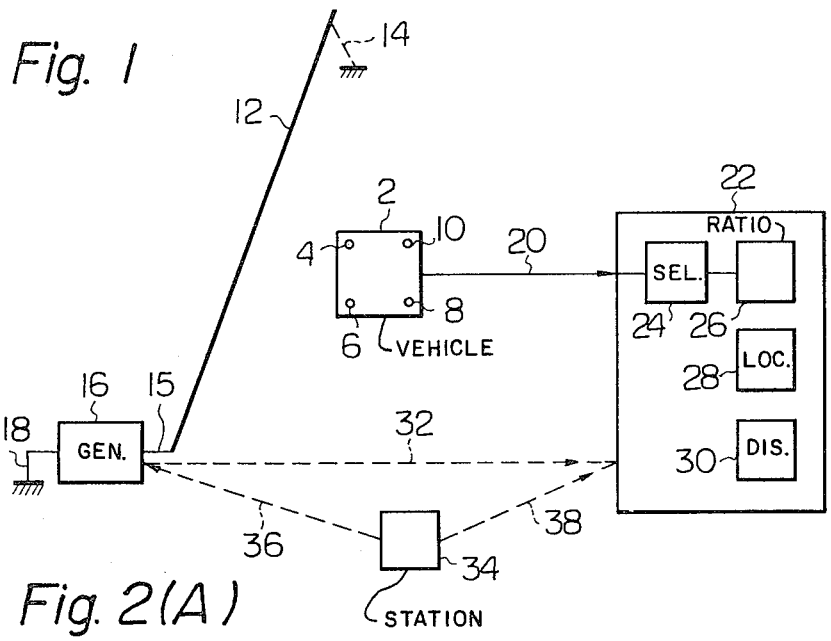
FIG. 1 is a drawing showing an embodiment of the cable detecting system in accordance with the present invention.

FIG. 1 is a drawing showing an embodiment of this invention. Referring to this drawing, a vehicle (2) mounted with non-directional magnetic flux detectors (4), (6), (8) and (10) at appropriate places thereon is allowed to move along the seabed, under control from a ship. A fault is supposed to have happened for a cable (12) buried in the seabed. For example, supposing conductors of the cable are grounded at a fault point (14), a cable detecting signal current can be supplied from a cable detecting signal source (16) through the one shore end (15) of the cable, and the return circuit thereof is formed by the fault grounding point (14) and a point (18) where the cable detecting signal source (16) is grounded.

A signal magnetic field or flux is developed around the cable by the cable detecting signal current. The intensity of this cable detecting signal magnetic field is proportional to the intensity of the cable detecting signal electric current and is inverse-proportional to the distance from the cable. The magnetic flux detectors (4), (6), (8) and (10) sense the cable detecting signal magnetic fields of which the intensities are inverse-proportional respectively to the distances from the cable and they transmit the output to a signal receiving unit (22) through a signal line (20). The signal receiving unit (22) is predominantly provided with four independent functions, including (1) selection of each component representing the cable detecting signal magnetic field out of output signals of all the magnetic flux detectors, (2) calculation of amplitude ratios of each of the selected signals, (3) calculation of location information for the cable, using the amplitude ratios as parameters and (4) display of the location information based on the results of the calculation referred to in Item (3). In the signal receiving unit (22) shown in FIG. 1, blocks (24), (26), (28) and (30) respectively perform the functions (1), (2), (3) and (4). It is of course possible to form a hardware having the functions (1), (2) and (3) not in a form in which some independent components such as blocks (24), (26) and (28) shown in FIG. 1 are assembled to form a single module. Further, in order to improve the function (1), it is possible to be provided with a means (32) to cause the signal receiving unit (22) equipped on a motor ship to receive the information (e.g. frequency and phase) regarding output signals of the cable detecting signal source or means (36) and (38) to cause the cable detecting signal source (16) and the signal receiving unit (22) to receive the common information sent out by the standard frequency broadcasting station (34). In this case, the signals containing noise received by the signal receiving unit (22) through the signal line (20) is processed in an equipment such as a correlation equipment, using the cable detecting signal information received by a means (32) or a means (38) as a reference for the purpose to selectively pick up the output signals representing the cable detecting signal magnetic field out of the aforementioned signals containing noise.

The behavior of a cable detecting system in accordance with this invention will be explained below, referring to FIG. 1 which shows an example thereof.

It is generally known that an electric current flowing in a cable causes to develop a magnetic field in the shape of concentric circles around the cable. When R (meters) and I (amperes) respectively represent the distance from the cable and the intensity of electric current flowing in the cable, the intensity of this magnetic field H (gauss) is represented by an equation H=a(I/R), wherein (a) is a proportion coefficient. Therefore, referring to FIG. 1, when a cable detecting signal electric current I is supplied to the cable (12), a magnetic field with the intensity shown in $$H = a(I/R)$$

is developed at a point distant from the cable (12) by the distance R around the cable 12.

The magnetic flux detectors (4), (6), (8) and (10) respectively sense the intensities of the cable detecting magnetic field corresponding to the distances from the cable (12), and the detected signals are sent to the signal receiving unit (22) through the signal line (20). In the signal receiving unit (22), the block (24) selects signal components respectively representing the cable detecting signal magnetic fields out of the output signals of the magnetic flux detectors (4), (6), (8) and (10), the block (26) computes the ratios of the selected signals with one another, and the block (28) applies to the ratios an arithmetical process which will be explained later for the ultimate purpose to obtain the location (the distance from the cable), the direction and the buried depth of the cable. The advantages of utilizing ratios of the output signals of magnetic flux detectors (4), (6), (8) and (10) in an arithmetical process for obtaining the ultimate solution are that (1) it is possible to obtain the location, the direction and the buried depth of a cable without knowing the value of the cable detecting signal electric current which is supplied to the cable, because the values of signal ratios are independent from the absolute values of the cable detecting signals current I to be filled in the equation explained in the above, and (2) a level fluctuation of the electric current supplied by the cable detecting signal source (16) does not cause any adverse effect to the performance of the detection. Therefore, it is unnecessary to pay serious attention to the output stability of the cable detecting signal source (16) proper, resulting in an easy production process and a less production cost of the cable detecting system in accordance with this invention. In the display unit (30), the location, the direction and the buried depth of the cable which are determined by the signal processing unit are continuously displayed on an equipment such as a cathode-ray tube display unit, which is effective in making the detection of a cable easy.

Figure 2A:
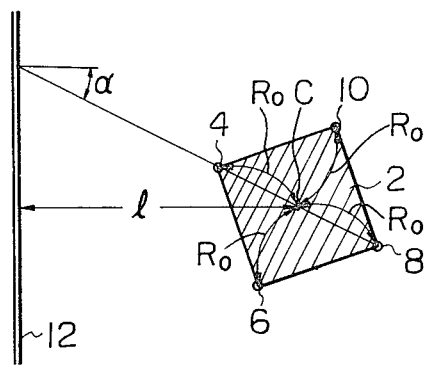
FIG. 2(A) and FIG. 2(B) are explanatory drawings of the operational principle of the cable detecting system according to the present invention.
Figure 2B:
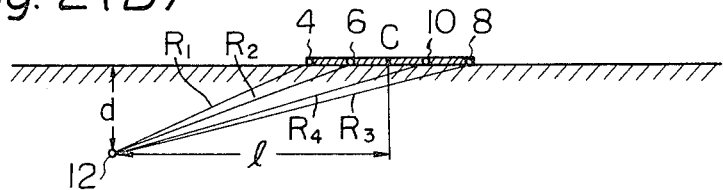

FIG. 2 is an explanatory drawing illustrated for further explanation of the embodiment presented by FIG. 1. FIG. 2(A) is a plan view and FIG. 2(B) is a side view. The identical numerals are given in both FIGS. 1 and 2 to the identical objects.

A vehicle (2) mounted with magnetic flux detectors (4), (6), (8) and (10) is supposed to be towed along the surface of the seabed in a plane parallel to the surface of the seabed in a direction making an angle of (α) between the extension of the diagonal of the detectors on the vehicle and the perpendicular line to the cable at the point that the extension crosses the cable. As shown in FIG. 2(A), each of the magnetic flux detectors (4), (6), (8) and (10) is supposed to be mounted at each corner of a square the diagonal length of which is $2R_0$. (λ) represents the horizontal distance between the center of the square and the cable (12), (d) represents the buried depth of the cable (12) and $H_1$, $H_2$, $H_3$ and $H_4$ are respectively put to the intensities of the cable detecting signal magnetic field to be detected by the magnetic flux detectors (4), (6), (8) and (10). Supposing the distances between the cable and the magnetic flux detectors are respectively $R_1$, $R_2$, $R_3$ and $R_4$, as shown in FIG. 2(B), the relations among the angle ($\alpha$), the horizontal distance ($\lambda$) and the buried depth (d) are represented by the following equations:

$$\left. \begin{array}{l} R_1^2 = d^2 + (l - R_o \cos \alpha)^2 \\ R_2^2 = d^2 + (l - R_o \sin \alpha)^2 \\ R_3^2 = d^2 + (l + R_o \cos \alpha)^2 \\ R_4^2 = d^2 + (l + R_o \sin \alpha)^2 \end{array} \right\} \quad (1)$$

As described earlier, the following relations are observed between each of the distances $R_1$ through $R_4$ and each of the intensities of magnetic field $H_1$ through $H_4$ detected by the magnetic flux detectors:

$$H_n = a \frac{I}{R_n} \quad n = 1, 2, 3, 4 \quad (2)$$

wherein, (a) is a proportion coefficient and I is the cable detecting signal electric current supplied to the cable. Now, new variables A, B and C are introduced which are ratios of the distances $R_2$ through $R_4$ to the distance $R_1$ which is selected as a reference.

$$\left. \begin{array}{l} A = \left(\dfrac{R_2}{R_1}\right)^2 = \left(\dfrac{H_1}{H_2}\right)^2 \\ B = \left(\dfrac{R_3}{R_1}\right)^2 = \left(\dfrac{H_1}{H_3}\right)^2 \\ C = \left(\dfrac{R_4}{R_1}\right)^2 = \left(\dfrac{H_1}{H_4}\right)^2 \end{array} \right\} \quad (3)$$

Accordingly, the amplitude ratio $H_1/H_2$ is identical to the reciprocal of the ratio of the distances between the magnetic flux detectors and the cable, which is $R_2/R_1$. Situations are the same for the other amplitude ratios, $H_1/H_3$ and $H_1/H_4$. As are clear from the equation (3), these variables A, B and C are independent from the cable detecting signal electric current I which is supplied to the cable. Derived from the equations (1) and (2) are following equations which respectively represent the cable location (l), the cable direction ($\alpha$) and the cable buried depth (d):

$$\left. \begin{array}{l} \alpha = \tan^{-1} \dfrac{A - C}{1 - B} \\ l = \dfrac{R_o}{2} \dfrac{B + C - A - 1}{B + C + A + 1} (\sin \alpha + \cos \alpha) \\ d = \sqrt{2 \dfrac{B + 1}{B - 1} R_o l \cos \alpha - (l^2 + R_o^2 \cos^2 \alpha)} \end{array} \right\} \quad (4)$$

Consequently, the direction of a cable ($\alpha$), the location of a cable (the horizontal distance between the center of the cable detecting vehicle and the cable to be detected) (l) and the buried depth of the cable (d) can be simultaneously obtained by application of arithmetical processes shown by equations (3) and (4) to the intensities of magnetic field $H_1$ through $H_4$ which are developed by the cable to be detected by the magnetic flux detectors (4), (6), (8) and (10).

Figure 3:
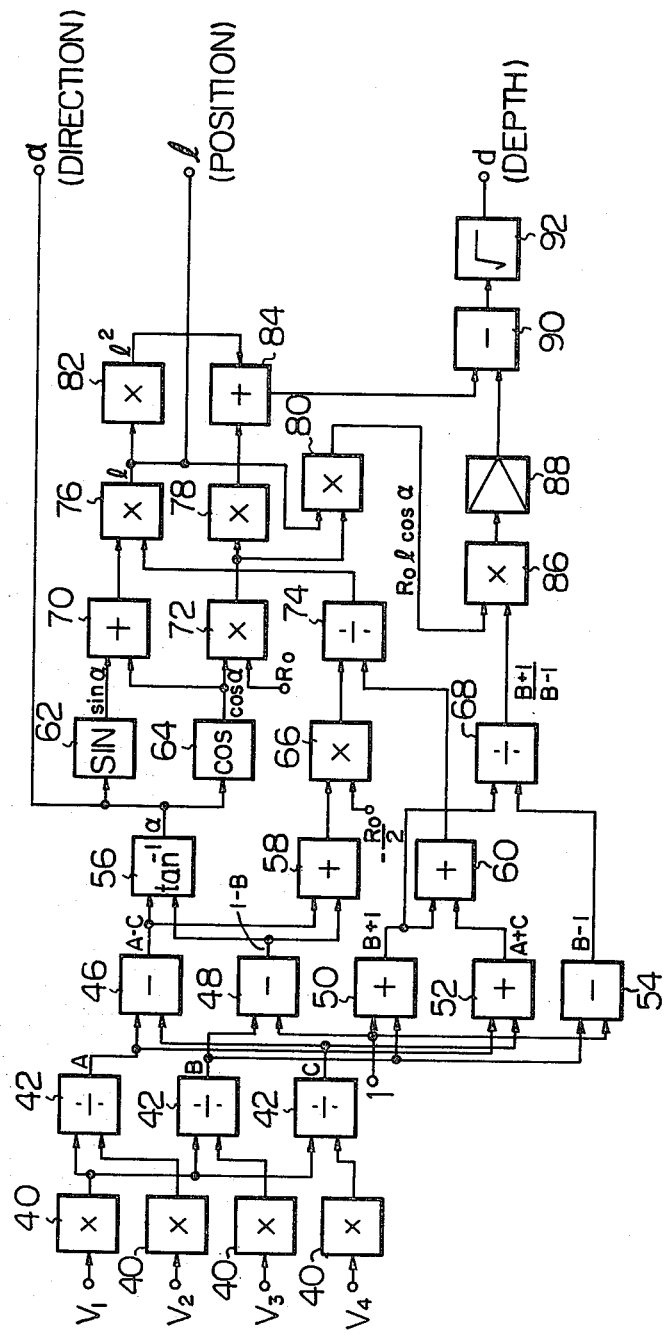
FIG. 3 is a block diagram of the major portion of the signal receiving unit (22) shown in FIG. 1.

FIG. 3 is a drawing explaining an example of a portion of the signal receiving unit (22). In the signal receiving unit (22), arithmetical processes shown by equations (4) are applied to the electric voltages $V_1$ through $V_4$ detected by magnetic flux detectors (4), (6), (8) and (10). Referring to FIG. 3, after being squared by a square circuit (40), the detected signals $V_1$ through $V_4$ are applied the aforementioned equations (3) by a division circuit (42) to be converted to ratio signals A, B and C. Thereafter, these ratio signals A, B and C, together with some suitable D.C. voltage, are applied to a subtraction circuit (46) and another subtraction circuit (48), before being further applied to an arctangent circuit (56) in which the cable direction ($\alpha$) is computed. This amount (d) is applied to a sine circuit (62) and a cosine circuit (64) to be converted to signals of (sin $\alpha$) and (cos $\alpha$). The signals A, B and C, together with certain constant signals (l) and ($-R_0/2$), are applied to a multiplication circuit (76), after they pass through addition circuits (50), (52), (58) and (60), subtraction circuits (48) and (54), a multiplication circuit (66) and a division circuit (74). The signals (sin $\alpha$) and (cos $\alpha$) are processed in an addition circuit (70), before being applied to a multiplication circuit (76), which multiplies these two inputs to obtain a signal ($\lambda$) which shows the location of the cable. The signal ($\lambda$) and the output signal of the multiplication circuit (72) are applied a multiplication process respectively by a multiplication circuit (82) and a multiplication circuit (78), before being applied an addition process by an addition circuit (84) and a multiplication process by a multiplication circuit (80). The output signal of a division circuit (68) is multiplied by the output of the multiplication circuit (80) in a multiplication circuit (86) and passes through a coefficient circuit (88), before being subtracted by the output of the addition circuit (84) in a subtraction circuit (90), the output of which is applied to a squareroot circuit (92) in which the buried depth (d) is calculated.

As explained in the above, three independent kinds of information, including the location, the direction and the buried depth of a cable, can be simultaneously obtained from the output $V_1$ through $V_4$ of magnetic flux detectors (4), (6), (8) and (10).

Figure 4:
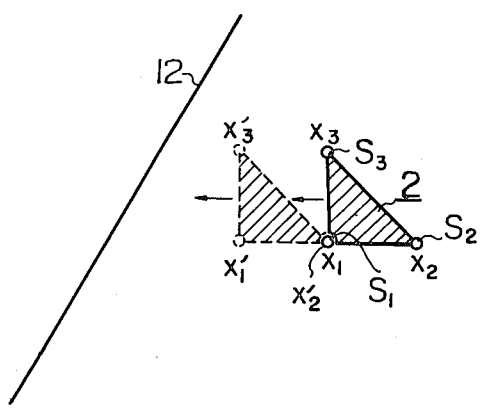
FIG. 4 is the modification of the cable detecting system shown in FIG. 1.

Although the above described embodiment is involved with four magnetic flux detectors, it is possible to implement this invention using three magnetic flux detectors, providing that the embodiment is provided with a means to keep constant the direction in which a vehicle (2) is towed during an arbitrary period of time, a means to memorize the output of magnetic flux detectors and a means to compare a current output and a memorized output of magnetic flux detectors. Referring to FIG. 4, for example, magnetic detectors are mounted on a vehicle (2) in a manner that each of the magnetic flux detectors are put at each corner of a right-angled isosceles triangle. The magnetic flux detector put at the right-angled corner is named $S_1$ and the two others are named respectively $S_2$ and $S_3$. The vehicle is towed along the line connecting $S_1$ and $S_2$ in the direction from $S_2$ to $S_1$. The outputs of the magnetic flux detectors are memorized at an arbitrary time. At this time, characters, $x_1$ and $x_2$, are respectively put to the location, $S_1$ and $S_2$, and the output amounts at the time or at these locations are respectively shown in $S_1(x_1)$ and $S_2(x_2)$. $S_1$ and $S_2$ being further moved on in the same manner, the output amount of $S_2$ becomes closer to that of $S_1$ at the location of $x_1$, $S_1(x_1)$. Providing that $S_1$ and $S_2$ are adjusted to have the same sensitivity, $S_2$ can be determined to have arrived at the location of $x_1$, when the output amount of $S_2$ has become equal to $S_1(x_1)$. Accordingly, if this time is detected by a level comparator, the output signals representing the cable detecting signal magnetic field at the locations shown in FIG. 4, $x_1$, $x_1'$, $x_3$ and $x_3'$, can be determined, utilizing the output amounts of magnetic flux detectors at the aforementioned time detected by a level comparator and the aforementioned memorized information. Because $x_1$, $x_1'$, $x_3$ and $x_3'$ respectively correspond to the corners of a square, these signals can be utilized for application of the above described system based on four magnetic flux detectors to obtain the direction, the location and the buried depth of a cable.

Figure 5:
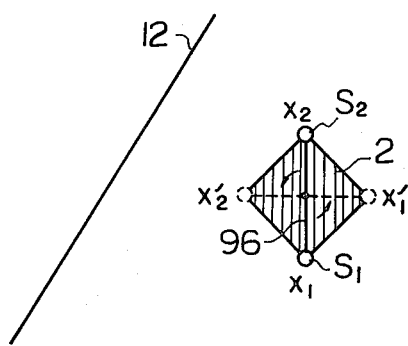
FIG. 5 is another modification of the cable detecting system shown in FIG. 1.
Figure 6:
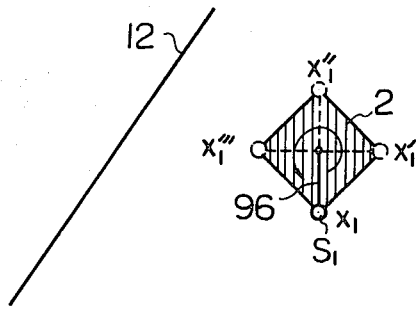
FIG. 6 is still another modification of the cable detecting system shown in FIG. 1.
Figure 7:
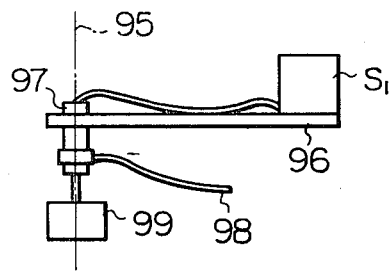
FIG. 7 is a schematic drawing of a rotary magnetic flux detector.

Further, FIGS. 5 and 6 are drawings of embodiments in which two magnetic flux detectors and only one magnetic flux detector are respectively employed. In these cases, as shown in FIG. 7, providing that a magnetic flux detector $S_1$ is mounted on the extreme end of a rotary bar (96) having a rotary shaft (95) at the center of a vehicle and is rotated by an electric motor (99), the same system as for the case where four magnetic flux detectors are employed can also be applicable in the same manner. Indicated as (97) is a slip ring and indicated as (98) is a lead wire to pick up output signals. Providing that the vehicle is stopped for a while at an arbitrary location distant from the cable and that thereafter the rotary bar (96) on which the magnetic flux detector is mounted, is turned by 90° in the case of FIG. 5, or by 360° in the case of FIG. 6, it is possible, in the case of FIG. 5, to obtain the same information as can be obtained in the case where four magnetic detectors are employed, utilizing the output amount detected by magnetic flux detectors at the locations, $x_1$ and $x_2$, and also utilizing the output amount detected by magnetic flux detectors at the post-turning locations, $x_1'$ and $x_2'$. In the case of FIG. 6, on the other hand, it is possible to obtain the same information as in the case of four magnetic flux detectors, utilizing the output amount detected by a magnetic flux detector at each time after the magnetic flux detector is finished turning by 90°, namely at each time when the magnetic flux detector is positioned at each location shown as $x_1$, $x_1'$, $x_1''$ and $x_1'''$ in FIG. 6.

Figure 8:
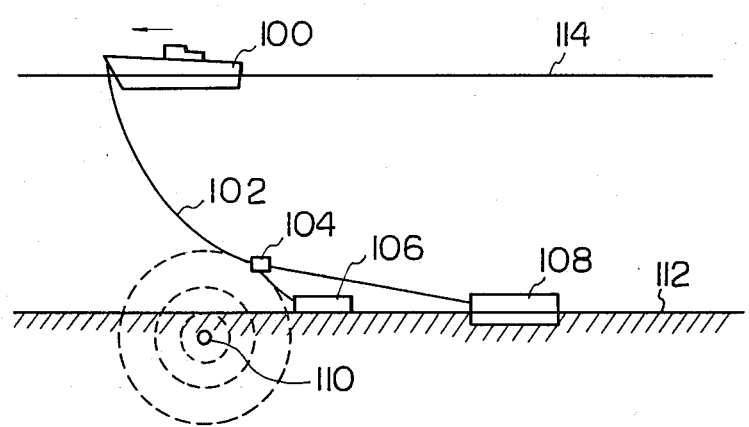
FIG. 8 is a drawing illustrating an implementation of this invention.

FIG. 8 is a schematic drawing illustrating an exemplified construction of a cable locating equipment to be employed for implementation of the system of this invention. Indicated as (100) is a cable ship, indicated as (102) is a towing rope containing signal wires therein, indicated as (104) is a connector distributing the towing rope and the signal wires respectively to a special hook (108) and a vehicle (106), indicated as (110) is a cable to be located, indicated as (112) is the surface of the seabed and indicated as (114) is the surface of the sea. Referring to the drawing, the vehicle (106), together with the special hook (108), is towed by the cable ship (100). When it detects the magnetic field (shown in broken lines in the drawing) developed around the cable by the cable detecting signal electric current supplied to the cable from the cable landing station, it sends the detected signal to a monitoring unit installed on the cable ship (100), which processes the signals thereon to determine the direction, the location and the buried depth of the cable. Since such information is known on the cable ship far prior to the time when the cable ship arrives at the location where the cable is buried, it is possible to take any action such as reduction of the towing pace and/or revision of the towing direction, when it is necessary.

Figure 9:
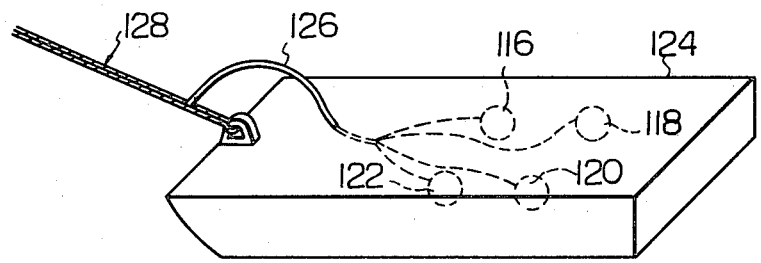
FIG. 9 is a perspective view of a vehicle mounting magnetic flux detectors in accordance with the present invention.

FIG. 9 is a drawing illustrating an example of a vehicle in accordance with this invention. Magnetic flux detectors (116), (118), (120) and (122) are mounted on a vehicle (124). Indicated as (126) is a signal wire and indicated as (128) is a towing rope containing the signal wire.

Any type of magnetic flux detector is acceptable for implementation of this invention, insofar as it is involved with the non-directional characteristics.

Although the above description is predominantly concentrated on an embodiment in which four magnetic flux detectors are arranged at each corner of a square, this does not limit the scope of this invention. As emphasized earlier, any number in excess of one is acceptable for the quantity of magnetic flux detectors. Though a square arrangement of magnetic flux detectors is selected in the above description just for simplicity in explanation, this does not limit the scope of this invention either. In the case of non-square arrangement of magnetic flux detectors, it is possible to obtain the information on the cable location, for example, by revising the construction of the arithmetic circuit shown in FIG. 3 or by replacement of the arithmetic circuit by a memory circuit which is inputted a table listing the combination of the relative ratios of the magnetic flux detector outputs and the information on the cable location, whereby a computor is employed to compare the combination of the relative ratios of the current outputs of magnetic flux detectors with the information memorized in the above mentioned memory for final determination of the cable location.

The above description for the case of buried submarine cables does not limit the scope of this invention, and it is of course possible to apply this invention to cases in which cables are not buried. Further, the application of this invention is not limited to the cases on the seabed. This invention can be applicable to the attempts for detection of the location of an on-shore buried cable, a cable buried in the riverbed and/or even an indoor overhead cable.

Though FIG. 9 illustrates the case in which a vehicle is towed along the surface of the seabed, the vehicle can be towed in the water apart from the seabed, providing that a means to measure the distance between the vehicle and the surface of the seabed (such as a ultrasonic altimeter) is mounted on the vehicle, otherwise the buried depth of the cable can be detected.

From the foregoing it will now be apparent that a new and improved cable detecting system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A cable detecting system for searching of an electrical cable in which an electrical current flows comprising non-directional flux measurement means located near the cable for measuring the flux from said electric current at four vertex points said points forming a horizontal square plane, means coupled to said flux measurement means for providing squared amplitude ratios of each of said magnetic flux to a selected one of said magnetic flux, and means responsive to said amplitude ratios for determining distance to the cable from center of said four vertex points, angle between a transverse direction to the cable and extension of a diagonal line from said four vertex points, and depth between the cable and said horizontal square plane, wherein said distance, said angle and said depth each have a mathematical relationship of said amplitude ratios.

2. A cable detecting system according to claim 1, wherein said flux measurement means has four non-directional flux detectors positioned respectively on four vertex points of a horizontal square substrate.

3. A cable detecting system according to claim 1, wherein said flux measurement means has three non-directional flux detectors positioned respectively on three vertex points of a horizontal substrate forming a right-angled isosceles triangle.

4. A cable detecting system according to claim 1, wherein said flux measurement means has a single non-directional flux detector mounted at an extreme end of a rod rotating in a horizontal plane, a motor for rotating said rod, a slip-ring for connecting an output signal of said flux detector to a nonrotating output lead line, whereby the measured flux by said flux detector is utilized in every 90° rotation of said rod.

5. A cable detecting system according to claim 1, wherein said flux measurement means has two non-directional flux detectors each mounted at opposite extreme end of a rotational rod, both positioned on a common axis at an angle of 180 degrees, a motor for rotating said rod through said common axis in a horizontal plane, a slip-ring for connecting an output of each flux detector to a nonrotating output lead line, whereby the measured flux by said flux detectors is utilized in every 90° rotation of said rod.

6. A cable detecting system for searching an electrical cable in which an electrical current flows comprising a cable ship, a vehicle having non-directional flux measurement means for measuring flux from said electric current at four vertex points, said points forming a horizontal square plane, said vehicle towed by said ship with a towing wire and said measured flux supplied to said cable through a signal wire provided along said towing wire, and said cable ship having means for providing squared amplitude ratios of each of said magnetic flux to a selected one of said magnetic flux, and means responsive to said amplitude ratios for obtaining distance to the cable from center of said four vertex points, angle between a transverse direction to the cable and extension of a diagonal line from said four vertex points, and depth between the cable and said horizontal square plane, wherein said distance, said angle and said depth each have a mathematical relationship to said amplitude ratios.

7. A cable detecting system for searching an electrical cable in which an electrical current flows comprising:
 (a) a cable ship,
 (b) a vehicle having non-directional flux measurement means for measuring flux from said electric current at four vertex points, said points forming a horizontal square plane on said vehicle,
 (c) said vehicle towed by said ship with a towing wire and said measured flux supplied to said cable ship through a signal wire provided along said towing wire,
 (d) said cable ship having means coupled to said signal wire for providing squared amplitude ratios (A, B, C) of each of said magnetic flux to a selected one of said magnetic flux,
 (e) means for obtaining $\alpha = \tan^{-1}(A-C)/(1-B)$, wherein $\alpha$ is an angle between a transverse direction to the cable and an extension of a diagonal line from said four vertex points,
 (f) means coupled to said $\alpha$ obtaining means for obtaining $\lambda = (R_o/2)(B+C-A-1)/(B+C+A+1))(\sin \alpha + \cos \alpha)$, wherein $\lambda$ is distance to the cable from center of said four vertex points and $R_0$ is a half length of said diagonal line of said square, and
 (g) means coupled to said $\lambda$ obtaining means for obtaining $$d = \sqrt{2 \frac{B+1}{B-1} R_o l \cos\alpha - (l^2 + R_O^2 \cos^2\alpha)},$$

wherein d is depth between the cable and said horizontal square plane.

* * * * *